United States Patent [19]
Dill et al.

[11] 3,797,575
[45] Mar. 19, 1974

[54] ADDITIVES FOR TEMPORARILY PLUGGING PORTIONS OF SUBTERRANEAN FORMATIONS AND METHODS OF USING THE SAME

[75] Inventors: Walter R. Dill; Jiten Chatterji; John A. Knox, all of Duncan, Okla.

[73] Assignee: Halliburton Company, Duncan, Okla.

[22] Filed: June 19, 1972

[21] Appl. No.: 264,117

[52] U.S. Cl. ............................... 166/282, 166/294
[51] Int. Cl. ..................... E21b 33/138, E21b 43/27
[58] Field of Search ........... 166/281, 282, 283, 294, 166/293, 292, 270, 307; 106/33

[56] References Cited
UNITED STATES PATENTS

| | | | |
|---|---|---|---|
| 2,272,672 | 2/1942 | Kennedy | 166/292 X |
| 3,103,974 | 9/1963 | Sievert et al. | 166/294 |
| 2,032,825 | 3/1936 | Ambrose | 166/292 |
| 2,238,930 | 4/1941 | Chamberlain et al. | 166/292 |
| 2,788,072 | 4/1957 | Goodwin | 166/281 |
| 2,860,709 | 11/1958 | Rieger | 166/281 X |
| 3,227,212 | 1/1966 | Black et al. | 166/294 |
| 3,291,212 | 12/1966 | Peacock | 166/294 |
| 3,443,640 | 5/1969 | Klein | 166/294 |
| 3,695,356 | 10/1972 | Argabright et al. | 166/294 X |

*Primary Examiner*—Stephen J. Novosad
*Attorney, Agent, or Firm*—Thomas R. Weaver; C. Clark Dougherty, Jr.; John H. Tregoning

[57] ABSTRACT

The present invention relates to additives for forming fluid loss or diverting agents in aqueous treating fluids used in the treatment of subterranean formations. The additives are combined with the aqueous treating fluid to bring about the precipitation of finely divided solids therein having desired size characteristics.

14 Claims, No Drawings

ADDITIVES FOR TEMPORARILY PLUGGING PORTIONS OF SUBTERRANEAN FORMATIONS AND METHODS OF USING THE SAME

In the matrix treatment of subterranean oil and gas producing formations wherein a treating solution is introduced to the formation it is often advantageous to temporarily but selectively plug portions of the formation with a solid material so that the treating solution is caused to flow to other portions of the formation. For example, in the matrix acidizing of permeable limestone and sandstone formations, one of the most important factors affecting the success or failure of the acidizing treatment is the proper distribution of the treating acid over the entire producing interval. Due to variations in the permeability of a producing formation, the treating acid enters the most permeable portion which has the least resistance to flow thereby increasing the permeability of that portion and causing it to accept ever increasing quantities of the treating acid. In order to prevent this uneven distribution of the acid it must be diverted from the most permeable portions of the formation into the less permeable portions thereof. While a variety of diverting agents have been used for this purpose with varying degrees of success, complete removal of the diverting agent from the formation after treatment is often difficult and expensive to achieve.

Further, in many producing wells migration of loose or incompetent formation sands with the produced fluid is experienced. In order to maintain the sands in the formation, special slotted liners, screens, gravel packs and/or sand packs are often utilized in the area of the producing zone to exclude sand. For example, casing is commonly cemented and perforated in the well bore penetrating a producing matrix with a slotted liner positioned within the casing adjacent to the matrix for retaining a sand pack between the casing and liner, which sand pack acts as a screen. In treating such liner completed producing formations whereby a treating fluid is injected into the formation, it is extremely difficult to divert the treating fluid and obtain proper distribution of the treating fluid over the producing interval. While various diverting agents have been utilized in the treating fluids used in such applications they often cannot be provided in a small enough particle size to pass through the slotted liner, screen or sand pack and divert on the producing interval.

By the present invention novel treating fluid additives are provided which form finely divided solids of desired size in aqueous treating fluids. The solids are subsequently removed from a treated formation by dissolution in produced formation fluids, or if required, the solids may be rapidly removed by a subsequent treatment.

The diverting or fluid loss agent forming additives of the present invention are basically comprised of a relatively water insoluble solid material dissolved in a non-aqueous solvent. When the additive is combined with an aqueous treating fluid, the solid material dissolved in the additive is precipitated in the aqueous treating fluid in finely divided form. The term "aqueous treating fluid" is used herein to mean any aqueous liquid or solution used in the treatment of subterranean formations including, but not limited to fracturing waters, e.g., fresh water, brines, etc; and aqueous acid solutions, e.g., 2 percent to 35 percent by weight aqueous solutions of hydrochloric acid, hydrofluoric acid, acetic acid, formic acid and mixtures of said acids.

In the preferred form of the invention an organic solid material is utilized in the additive which is soluble in formation fluids. When the aqueous treating fluid containing such organic solid material has been introduced into the formation, the solid material is subsequently removed from the treated formation by dissolution in formation fluids. Examples of organic solid materials which are particularly suitable for use in accordance with the present invention are benzoic acid, salicylic acid, abietic acid, myristic acid and naphthalene. These organic solid materials have relatively high melting points (above 120°F) and limited solubility in aqueous fluids so that they readily precipitate in aqueous treating fluids and function efficiently as diverting agents. Further, the organic solid materials are soluble in produced hydrocarbons to the degree required for removal by dissolution therein. However, if rapid removal of the solid material from a treated formation is required this may be accomplished by flushing the formation with a solvent for the solid material. Of the organic solid materials listed above, benzoic acid, salicylic acid and naphthalene are preferred with benzoic acid being the most preferred.

A variety of non-aqueous solvents can be utilized in accordance with the present invention, e.g., low molecular weight paraffin alcohols such as methanol, propanol and isopropanol; acetone, methyl ethyl ketone; 2-ethoxyethanol; methylformacel; chloroform; and ether. Low molecular weight paraffin alcohols are preferred in that they readily dissolve a variety of solid materials suitable for use in accordance with the present invention. Of these, isopropanol and methanol are most preferred.

In preparing the additives of the present invention the organic solid material utilized is combined with and dissolved in the non-aqueous solvent used. The particular quantity of solid material dissolved in the solvent depends upon the minimum temperature to which the additive will be exposed. That is, the quantity of solid material dissolved in the solvent should be such that the solid material does not precipitate at the minimum temperature to which the additive will be exposed. For example, an additive of the present invention comprised of benzoic acid dissolved in isopropyl alcohol in the amount of 1 pound of solid benzoic acid per 1 gallon of alcohol precipitates solid benzoic acid at a temperature of −30°F. An additive including 2 pounds of benzoic acid per 1 gallon of alcohol precipitates benzoic acid at a temperature of 35°F, and an additive having 3 pounds of benzoic acid per 1 gallon of alcohol dissolved therein precipitates benzoic acid at a temperature of 70°F. When methanol is used as the solvent instead of isopropanol and benzoic acid is dissolved therein in a quantity of 1 pound of benzoic acid per 1 gallon of methanol, solid benzoic acid is precipitated at −40°F. At 2 pounds of benzoic acid per 1 gallon of methanol precipitation occurs at −12°F, and at 3 pounds of benzoic acid per 1 gallon of methanol, precipitation occurs at 34°F.

Isopropanol is preferred for use as the solvent in the additives of the present invention in that its handling properties are good. The preferred organic solid material, benzoic acid, is relatively insoluble in aqueous treating solutions and is readily soluble in isopropanol and produced oil and gas. The preferred additive of the present invention is comprised of benzoic acid dissolved in isopropyl alcohol in an amount of about 2 pounds of benzoic acid per 1 gallon of alcohol.

As stated previously, when a diverting agent forming additive of the present invention containing a dissolved organic solid material is combined with an aqueous treating fluid such as an aqueous acid solution, water, brine, etc., the organic solid material is precipitated in the aqueous treating fluid. However, the additive must be added to the aqueous treating fluid in an amount such that a greater quantity of organic solid material is precipitated than that which is subsequently dissolved by the aqueous treating fluid at the highest temperature to which the treating fluid will be exposed. For example, for a 15 percent by weight aqueous hydrochloric acid solution, the solubility of benzoic acid at 150°F is 0.046 pounds per gallon. Thus, for a formation treating temperature of 150°F, and additive of the present invention containing benzoic acid must be added thereto in an amount greater than that required to precipitate 0.046 pounds of benzoic acid per gallon of HCl solution. The particular quantity of additive and resulting precipitate which should be used over and above that which is dissolved by the aqueous treating fluid depends on a variety of factors such as the particular treatment and permeability of the formation to be treated and the amount of diversion or plugging required. Generally, however, a quantity of precipitated solid material in the aqueous treating fluid in the range of from about 10 to about 150 pounds per 1,000 gallons of treating fluid is required.

The size of the particles of solid material precipitated in an aqueous treating fluid upon mixing an additive of the present invention therewith can be controlled by the addition of a surface active agent to the treating fluid, or alternatively, the surface active agent can be included as a component in the additive. The presence of a surface active agent in the treating fluid also brings about the proper dispersion of the precipitated solid particles therein.

A great variety of commercially available surface active agents may be utilized in accordance with the present invention. The surface active agents may be anionic, cationic, nonionic, amphoteric, or blends thereof. The criteria for selecting a particular surface active agent for use in accordance with the present invention are as follows:

1. The surface active agent controls the particle size of the precipitated solid material which results when an additive of the present invention is added to a particular aqueous treating fluid. Thus the particular surface active agent used must bring about the precipitation of solid material in the particle size required for the particular job to be accomplished with the treating fluid.

2. The surface active agent should effectively disperse the solid precipitate throughout the treating fluid.

3. The surface active agent should be compatible with the particular formation to be treated.

When the preferred additive of the present invention, i.e., benzoic acid dissolved in methanol or isopropanol, is utilized in an aqueous acid solution, fluffy particles of benzoic acid are precipitated if the acid solution or additive does not contain a surface active agent. When a commercially available surface active agent such as acetyl trimethyl ammonium chloride, benzyl trimethyl ammonium chloride, a betaine, or an alkylsulfonate is present in the aqueous acid solution, either by direct addition to the acid solution or by addition thereto as a component of the amount in an mount in the range of from about 0.2 percent to about 1.0 percent by weight of acid solution, large granular particles of solid benzoic acid (larger than about 100 microns) result. If highly dispered benzoic acid particles fine enough to pass through a 20–40 mesh sand pack (less than about 100 microns) are required, surface active agents such as a nonionic ethoxylated straight chain alcohol, a nonionic blend of an ethoxylated sodium salt of an amphoteric compound and acetyl phenoxy polyethoxy phenol, or a blend of a nonionic surfactant and an anionic amphoteric surfactant can be used in the acid solution in an amount in the range of from about 0.2 percent to about 0.5 percent by weight to bring about this result. When very finely divided benzoic acid particles are required, i.e., particles which will pass through a 20–40 mesh or a 40–60 mesh sand screen and divert on formation sand, surface active agents such as a nonionic ethoxylated straight chain alcohol or an ethoxylated sodium salt of an amphoteric compound and acetyl phenoxy polyethoxy phenol can be utilized in the treating solution in an amount of from about 0.5 percent to about 1.0 percent by weight of treating solution.

The preferred surface active agent for use with the preferred benzoic acid additive of the present invention is a commercially available nonionic ethoxylated straight chain alcohol. When the surface active agent is utilized as a component part of the additive, its concentration therein can vary from 0.2 percent to 3 percent by weight depending upon the type and quantity of precipitated solids which are desired in the aqueous treating solution.

In an alternate aspect of the present invention an additive for bringing about the precipitation of a solid organic acid in an aqueous acidizing treating solution is provided. A water soluble salt of benzoic acid or salicylic acid is dissolved in water and the resulting aqueous additive is combined with an aqueous acid treating solution to be utilized in acidizing a subterranean formation. When the aqueous salt solution additive mixes with the acid treating solution, solid organic acid is precipitated in the same manner as described above and the size and dispering properties of the particles can be controlled through the addition of a surface active agent to the additive or the acid solution as described above. A preferred additive of this type is one prepared by dissolving ammonium benzoate in water in an amount in the range of from about 0.075 pounds to about 1.8 pounds per 1 gallon of water.

In order to insure a clear understanding of the present invention, the following examples are given:

EXAMPLE 1

An additive of the present invention is prepared by dissolving benzoic acid in methanol in an amount of 2.7 pounds of benzoic acid per 1 gallon of methanol. Portions of the additive are combined with 15 percent by weight aqueous hydrochloric acid solutions in amounts of 3 percent by volume of acid. The acid solutions contain various concentrations of various surface active agents as noted in Table I below. The resulting acid solutions containing solid benzoic acid precipitate are observed for precipitate appearance, dispersion of the precipitate in the acid solutions and how long the precipitate remains suspended in the solutions. The results of these tests are shown in Table I below.

TABLE I.—PROPERTIES OF PRECIPITATE FORMED IN 15% HCl SOLUTIONS USING VARIOUS SURFACE ACTIVE AGENTS IN THE HCl SOLUTIONS

| Surface active agent used | Concentration of surface active agent in HCl solution, percent by volume of acid solution | Appearance of benzoic acid precipitate | Dispersing properties of precipitate | Time precipitate remains suspended in solution, minutes*** |
|---|---|---|---|---|
| None | | Fluffy | Good | 5 |
| 1* | 0.2 | Coarse-granular | Good | 5 |
| 1* | .4 | Coarse-granular | Good | 10 |
| 1* | .6 | Fine-granular | Good | 10 |
| 1* | .8 | Fine-granular | Good | 7 |
| 1* | 1.0 | Fine-granular | Good | 3 |
| 2** | .1 | Coarse-granular | Good | 15 |
| 2** | .2 | Fine-granular | Good | 25 |
| 2** | .3 | Fine-granular | Good | 25 |
| 2** | .4 | Fine-granular | Good | 30 |
| 2** | .5 | Fine-granular | Good | 30 |

*A commercially available blend of a nonionic surfactant and an anionic amphoteric surfactant.
**A commercially available nonionic ethoxylated straight chain alcohol.
***Settling of solids detected at times listed. When fine-granular particles resulted, settling occurred slowly.

From the foregoing, it can be seen that the particle size of the precipitate formed can be controlled through the use of a particular quantity of selected surface active agent in the treating solution.

EXAMPLE 2

Various quantities of various surface active agents are added to portions of the methanol-benzoic acid additive described in Example 1 above. The resulting methanol-benzoic acid-surfactant mixtures are combined with 15 percent by weight aqueous hydrochloric acid solutions in an amount of 3 percent by volume (based on the volume of acid solution) with stirring. The resulting precipitates are observed for appearance, dispersion properties and time in suspension. The results of these tests are shown in Table II below.

hydrochloric acid solutions (15 percent by weight HCl) into sand formations are conducted to determine the effectiveness of the diverting agent forming additives and methods of the present invention. A 2-inch internal diameter column containing a 3-inch lower layer of 70–170 mesh (U.S. Sieve Series) sand and a 2-inch upper layer of 20–40 mesh sand is used. The 70–170 mesh sand has a permeability of 9 darcies and simulates the producing formation. The 20–40 mesh sand has a permeability of 121 darcies and simulates a sand pack or screen. A variety of acid treating solutions are prepared by combining a methyl alcohol-benzoic acid additive of the present invention (2.7 pounds of benzoic acid per 1 gallon of solution) with 15 percent aqueous hydrochloric acid solutions in various amounts. Various surface active agents are added to the 15 percent aqueous hydrochloric acid solutions in various amounts prior to combining the additives therewith. The treating solutions containing precipitated diverting agent are each flowed downwardly through the column at a constant differential pressure of 40 psi and a temperature of 76°F. The diverting ability of the precipitate formed in the acid treating solutions is determined by noting the decrease in flow through the column and decrease in permeability thereof during the first 5 min- TABLE II.—PROPERTIES OF PRECIPITATE FORMED IN 15% HCl SOLUTIONS USING VARIOUS SURFACE ACTIVE AGENTS IN THE PRECIPITATE FORMING ADDITIVES

| Surface active agent used | Concentration of surface active agent in methanol-benzoic acid additive, percent by volume of additive | Appearance of benzoic acid precipitate | Dispersing properties of precipitate | Time precipitate remains suspended in solution, minutes |
|---|---|---|---|---|
| 1* | 1.0 | Fluffy | Good | 30+ |
| 1* | 2.0 | Fluffy | Good | 30+ |
| 1* | 3.0 | Granular-fine | Good | 10 |
| 2** | 0.1 | Fluffy | Good | 30+ |
| 2** | 0.2 | Fluffy | Good | 30v |
| 2** | 0.3 | Fluffy | Good | 30+ |
| 2** | 0.4 | Granular-fine | Good | 10 |
| 2** | 0.5 | Granular-fine | Good | 30 |

*A Commercially available blend of a nonionic surfactant and an anionic amphoteric surfactant.
**A commercially available nonionic ethoxylated straight chain alcohol.

EXAMPLE 3

Laboratory tests simulating the injection of aqueous utes of each test. The results of these tests are shown in Table III.

which various benzoic acid precipitates are deposited. Various surface active agents are added to 15 percent TABLE III)—PERMEABILITY DECREASE OF SAND WHEN FLOWING 15% HCl SOLUTIONS THERETHROUGH CONTAINING DIVERTING AGENT FORMING ADDITIVES

| Concentration of additive mixed with HCl solution, percent by volume of acid solution | Surface active agents in acid solution-concentration, percent by volume of acid solution | Flow of HCl solution through column | | | | | Percent permeability decrease**** | |
|---|---|---|---|---|---|---|---|---|
| | | First minute | Second minute | Third minute | Fourth minute | Fifth minute | First minute | Second minute |
| 0 | *1 − 0.2% **2 − 1.0% | 2666 | | | | | | |
| 0.4 | *1 − 0.2% **2 − 1.0% | 1545 | | | | | 42 | |
| 0.9 | *1 − 0.2% **2 − 1.0% | 1460 | | | | | 45 | |
| 2.0 | *1 − 0.2% **2 − 1.0% | 342 | 82 | 67 | 62 | 60 | 87 | 97 |
| 3.0 | *1 − 0.2% **2 − 1.0% | 190 | 38 | 30 | 25 | 23 | 93 | 98.5 |
| 3.0 | *1 − 0.2% | 1000 | 447 | 148 | 62 | 24 | 62 | 83 |
| 3.0 | ***3 − 1.0% **2 − 1.0% | 187 | 64 | 48 | 40 | 34 | 93 | 97.5 |

*A commercially available blend of a nonionic surfactant and an anionic amphoteric surfactant.
**A commercially available blend of an alkyl benzyl ammonium chloride compound, nonionic ester compounds and nonionic ethoxylate compounds which exhibit the overall characteristics of an anionic surface active agent.
***A commercially available foam inhibitor material.
****Most of the percipitate deposited on the simulated formation sand in each test, i.e., at the interface between the 70–170 mesh sand and the 20–40 mesh sand.

The operability of the additives and methods of the present invention at a differential pressure of 40 psi is illustrated by the above data.

EXAMPLE 4

Tests similar to those described in Example 3 are conducted except that a cell having a 2 ¼ inch internal diameter is used and the test acid treating solutions are flowed through the cell at a constant 1,000 psi differential pressure and a temperature of 76°F. No surface active agent is utilized. The results of these tests are shown in Table IV.

TABLE IV.—PERMEABILITY DECREASE OF SAND WHEN FLOWING 15% HCl SOLUTIONS THERETHROUGH CONTAINING DIVERTING AGENT FORMING ADDITIVES

| Concentration of additive in HCl solution, percent by volume of acid solution | Volume of acid flowed through cell, ml. | Time required for acid to flow through cell, sec. | Permeability decrease, percent |
|---|---|---|---|
| 0 | 2300 | 1.2 | 0 |
| 1 | 2300 | 8.0 | 85 |
| 2 | 2300 | 12.0 | 90 |
| 3 | 2300 | 21.0 | 94 |
| 4 | 2300 | 30.0 | 96 |
| 8 | 2300 | 40.0 | 97 |

NOTE: Most of the precipitate deposited on the simulated formatione sand in each test, i.e., at the interface between the 70–170 mesh sand and the 20–40 mesh sand.

The operability of the present invention to divert acid solutions at a differential pressure of 1,000 psi is illustrated by the foregoing.

EXAMPLE 5

Tests similar to those described in Example 3 are conducted to determine the size of sand particles on which various benzoic acid precipitates are deposited. Various surface active agents are added to 15 percent by weight aqueous hydrochloric acid solutions in an amount of 0.5 percent by volume of the acid solution. An additive of the present invention (2.7 pounds of benzoic acid per 1 gallon of solution) is combined with each test acid solution in an amount of 3 percent by volume of solution and the resulting mixture flowed through the sand tested. The results of these tests are shown in Table V below.

TABLE V.—DEPOSITION OF PRECIPITATE ON VARIOUS SIZES OF SAND USING VARIOUS SURFACE ACTIVE AGENTS IN ACID SOLUTION

| Surface active agent | Size of sand (U.S. sieve series) | | | |
|---|---|---|---|---|
| | 10–20 mesh | 20–40 mesh | 40–60 mesh | 70–170 mesh |
| 1* | Passed | Passed | Deposited | Deposited |
| 2** | Passed | Passed | Passed | Deposited |
| 3*** | Passed | Deposited | Deposited | Deposited |
| 4**** | Passed | Deposited | Deposited | Deposited |

*A commercially available blend of a nonionic surfactant and an anionic amphoteric surfactant.
**A commercially available nonionic ethoxylated straight chain alcohol.
***A commercially available blend of a nonionic surfactant and a quaternary ammonium chloride compound.
****A commercially available blend of nonionic and anionic surface active agents.

The data presented in Table V illustrates that the particle size of the precipitate formed by the additives of the present invention can be selectively controlled.

EXAMPLE 6

Laboratory tests simulating the injection of aqueous hydrochloric acid solutions (15 percent by weight HCl) into sand formations are conducted to determine the effectiveness of various diverting agent forming additives of the present invention. A 2-inch internal diameter column containing a 3-inch lower layer of 70–170 mesh sand (simulating a 9 darcy permeability producing formation) and an upper layer of 20–40 mesh sand (simulating a 121 darcy permeability sand pack) is used. Various additives of the present invention are prepared by dissolving the organic solid materials noted in Table VI below in isopropyl alcohol in the quantities given in Table VI. The various additives are then combined with aqueous acid solutions (15 percent by weight HCl containing 0.6 percent by volume of the surface active agent noted in Table VI) in an amount of 3 percent by volume of acid.

The resulting acid solutions containing precipitated diverting agent are flowed downwardly through the column at a constant pressure of 40 psi and a temperature of 76°F. The diverting ability of the precipitate formed in each of the acid solutions is determined by noting the decrease in flow through the column and decrease in permeability thereof during the first five minutes of each test. The results of these tests are shown in Table VI below:

While preferred embodiments of the present invention have been described for purposes of disclosure, it is to be understood that the description and foregoing examples are given to illustrate and explain the invention, and suitable variations may be made within the scope of the appended claims without departing from the invention.

What is claimed is:

1. A method of temporarily plugging portions of a subterranean well formation when introducing an aqueous treating fluid therein which comprises the steps of:
   combining an additive with said aqueous treating fluid which causes the precipitation of a finely divided solid precipitate therein;
   introducing the aqueous treating fluid containing the solid precipitate into the formation so that portions of the formation are plugged by the solid precipitate; and
   subsequently removing the solid precipitate from said formation wherein said additive is comprised of a relatively water insoluble organic solid material dissolved in a non-aqueous solvent.

TABLE VI.—PERMEABILITY DECREASE OF SAND WHEN FLOWING 15% HCl SOLUTIONS* THERETHROUGH CONTAINING VARIOUS DIVERTING AGENT FORMING ADDITIVES

| Organic solid material in additive | Concentration of organic solid material, pounds per gallon of additive | Flow of HCl solution through column, mls. | | | | | Percent permeability decrease** | |
|---|---|---|---|---|---|---|---|---|
| | | First minute | Second minute | Third minute | Fourth minute | Fifth minute | First minute | Second minute |
| | | 2666 | | | | | | |
| Benzoic Acid | 2 | 1065 | 457 | 155 | 75 | 32 | 60 | 83 |
| Salicylic acid | 2 | 1190 | 610 | 138 | 101 | 76 | 55 | 77 |
| Naphthalene | ***0.6 | 650 | 340 | 250 | 180 | 150 | 76 | 87 |
| Myristic acid | 2 | 234 | 50 | 30 | 25 | 23 | 91 | 98 |
| Abietic acid | 2 | 335 | 31 | 19 | 9 | 7 | 87 | 99 |

* Acid solutions contain 0.6% by volume of a commercially available blend of a nonionic surfactant and an anionic amphoteric surfactant.
** Most of the precipitate deposited on the simulated formation sand in each test, i.e., at the interface between the 70–170 mesh sand and the 20–40 mesh sand.
*** Isopropanol will dissolve 0.6 pounds of naphthalene per gallon of solution at 76°F. 5.0% by volume of additive combined with acid solution.

EXAMPLE 7

Methanol-benzoic additives containing 2.7 pounds of benzoic acid per gallon of solution and various quantities of various surface active agents as noted in Table VII below are combined with aqueous acid solutions (15 percent by weight HCl) in the amount of 3 percent by volume of acid. The resulting acid solutions containing precipitated benzoic acid are observed for precipitate appearance, dispersion of the precipitate in the acid solutions and how long the precipitate remains suspended in the solutions. The results of these tests are shown in Table VII below:

2. The method of claim 1 wherein the step of removing the solid precipitate from said formation comprises producing formation fluids from said formation so that the solid precipitate is dissolved thereby.

3. The method of claim 1 wherein the solvent is a low molecular weight paraffin alcohol.

4. The method of claim 3 wherein the relatively water insoluble organic solid material is selected from the group consisting of benzoic acid, salicylic acid, abietic acid, myristic acid and naphthalene.

5. The method of claim 4 wherein the relatively water insoluble organic solid material is benzoic acid and the non-aqueous solvent is isopropyl alcohol.

TABLE VII.—PROPERTIES OF PRECIPITATE FORMED IN 15% HCl SOLUTIONS USING VARIOUS QUANTITIES OF SURFACE ACTIVE AGENT IN THE ADDITIVES

| Surface active agent used | Concentration of surface active agent in additive, percent by weight | Appearance of benzoic acid precipitate | Dispersing properties of precipitate | Time precipitate remains suspended in solution, minutes |
|---|---|---|---|---|
| 1* | 1.0 | Fluffy | Good | 30+ |
| 1* | 2.0 | Fluffy | Good | 30+ |
| 1* | 3.0 | Granular-fine | Good | 10 |
| 2** | 0.1 | Fluffy | Good | 30+ |
| 2** | 0.2 | Fluffy | Good | 30+ |
| 2** | 0.3 | Fluffy | Good | 30+ |
| 2** | 0.4 | Granular-fine | Good | 10 |
| 2** | 0.5 | Granular-fine | Good | 30 |

* A commercially available blend of a nonionic surfactant and an anionic amphoteric surfactant.
** A commercially available nonionic ethoxylated straight chain alcohol.

6. The method of claim 1 wherein the additive is further characterized to include a surface active agent mixed therewith.

7. The method of claim 6 wherein the organic solid material is benzoic acid, the non-aqueous solvent is isopropyl alcohol and the surface active agent is a nonionic ethoxylated straight chain alcohol.

8. The method of claim 1 which is further characterized to include the step of adding a surface active agent to the aqueous treating solution prior to combining said additive therewith.

9. The method of claim 8 wherein the additive is comprised of benzoic acid dissolved in isopropyl alcohol.

10. The method of claim 9 wherein the surface active agent is a nonionic ethoxylated straight chain alcohol.

11. A method of temporarily plugging portions of a subterranean formation when introducing an aqueous acid solution therein which comprises the steps of:
combining with said aqueous acid solution an additive comprised of an aqueous solution of a water soluble salt of a solid organic acid so that the solid organic acid is precipitated in said acid solution in finely divided form;
introducing the aqueous acid solution containing the solid organic acid precipitate into the formation so that portions of the formation are plugged by said precipitate; and
subsequently removing the solid precipitate from the formation.

12. The method of claim 11 wherein the water soluble solid organic acid salt is ammonium benzoate.

13. The method of claim 12 wherein the step of removing the solid precipitate from the formation comprises producing hydrocarbons from the formation so that the benzoic acid precipitate is dissolved therein.

14. The method of claim 13 wherein the step of removing the solid precipitate from the formation comprises flushing the formation with a low molecular weight paraffin alcohol solution so that the precipitate is dissolved therein.

* * * * *